United States Patent
Oehring et al.

(10) Patent No.: US 10,107,086 B2
(45) Date of Patent: *Oct. 23, 2018

(54) REMOTE MONITORING FOR HYDRAULIC FRACTURING EQUIPMENT

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,033

(22) Filed: Dec. 11, 2017

(65) Prior Publication Data

US 2018/0112507 A1 Apr. 26, 2018

Related U.S. Application Data

(63) Continuation of application No. 15/293,681, filed on Oct. 14, 2016, now Pat. No. 9,840,901, which is a (Continued)

(51) Int. Cl.
*E21B 43/26* (2006.01)
*F01D 15/08* (2006.01)
(Continued)

(52) U.S. Cl.
CPC ............ *E21B 43/26* (2013.01); *E21B 43/267* (2013.01); *F01D 15/08* (2013.01); *F01D 15/10* (2013.01);
(Continued)

(58) Field of Classification Search
CPC ........ E21B 43/26; E21B 43/267; F01D 15/08; F01D 15/10; F02C 3/22; F04B 15/02;
(Continued)

(56) References Cited

U.S. PATENT DOCUMENTS

| | | | |
|---|---|---|---|
| 1,671,436 A | 5/1928 | Melott | |
| 2,004,077 A | 6/1935 | McCartney | |

(Continued)

FOREIGN PATENT DOCUMENTS

| | | |
|---|---|---|
| CA | 2966672 | 10/2012 |
| CN | 101977016 | 2/2011 |
| JP | 2004264589 | 9/2004 |

OTHER PUBLICATIONS

UK Power Networks—Transformers to Supply Heat to Tate Modern—from Press Releases May 16, 2013.
(Continued)

*Primary Examiner* — Wei Wang
(74) *Attorney, Agent, or Firm* — Hogan Lovells US LLP

(57) ABSTRACT

A hydraulic fracturing system for fracturing a subterranean formation including a pump in communication via pump components with a wellbore that intersects the formation, and that pressurizes fluid in the wellbore, the fluid comprising a fracturing fluid slurry. The system further includes hydraulic fracturing system components for making the fracturing fluid slurry, and a monitoring system that selectively captures and transmits real time images of at least one of the hydraulic fracturing system components or pump components to enable remote monitoring of the at least one of the hydraulic fracturing system components or pump components.

20 Claims, 5 Drawing Sheets

Related U.S. Application Data continuation-in-part of application No. 15/202,085, filed on Jul. 5, 2016, which is a continuation of application No. 13/679,689, filed on Nov. 16, 2012, now Pat. No. 9,410,410.

(60) Provisional application No. 62/242,566, filed on Oct. 16, 2015.

(51) Int. Cl.
    *F01D 15/10* (2006.01)
    *F04B 17/03* (2006.01)
    *F04B 19/22* (2006.01)
    *F04B 47/02* (2006.01)
    *F04B 49/20* (2006.01)
    *F04B 51/00* (2006.01)
    *F02C 3/22* (2006.01)
    *H02P 23/00* (2016.01)
    *F04B 15/02* (2006.01)
    *F04B 49/06* (2006.01)
    *H04N 7/18* (2006.01)
    *E21B 43/267* (2006.01)

(52) U.S. Cl.
    CPC .............. *F02C 3/22* (2013.01); *F04B 15/02* (2013.01); *F04B 17/03* (2013.01); *F04B 19/22* (2013.01); *F04B 47/02* (2013.01); *F04B 49/06* (2013.01); *F04B 49/20* (2013.01); *F04B 51/00* (2013.01); *H02P 23/00* (2013.01); *H04N 7/185* (2013.01)

(58) Field of Classification Search
    CPC .......... F04B 17/03; F04B 19/22; F04B 47/02; F04B 49/06; F04B 49/20; F04B 51/00; H02P 23/00; H04N 7/185
    See application file for complete search history.

(56) References Cited

U.S. PATENT DOCUMENTS

| | | |
|---|---|---|
| 2,183,364 A | 12/1939 | Bailey |
| 2,220,622 A | 11/1940 | Aitken |
| 2,248,051 A | 7/1941 | Armstrong |
| 2,753,940 A | 7/1956 | Bonner |
| 3,061,039 A | 10/1962 | Peters |
| 3,066,503 A | 12/1962 | Fleming |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 4,037,431 A | 7/1977 | Sugimoto |
| 4,151,575 A | 4/1979 | Hogue |
| 4,226,299 A | 10/1980 | Hansen |
| 4,265,266 A | 5/1981 | Kierbow et al. |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,793,386 A | 12/1988 | Sloan |
| 4,845,981 A | 7/1989 | Pearson |
| 4,922,463 A | 5/1990 | Del Zotto et al. |
| 5,025,861 A | 6/1991 | Huber et al. |
| 5,130,628 A | 7/1992 | Owen |
| 5,131,472 A | 7/1992 | Dees et al. |
| 5,422,550 A | 6/1995 | McClanahan |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers et al. |
| 5,907,970 A | 6/1999 | Havlovick et al. |
| 6,142,878 A | 11/2000 | Barin |
| 6,164,910 A | 12/2000 | Mayleben |
| 6,202,702 B1 | 3/2001 | Ohira |
| 6,254,462 B1 | 7/2001 | Kelton |
| 6,271,637 B1 | 8/2001 | Kushion |
| 6,315,523 B1 | 11/2001 | Mills |
| 6,477,852 B2 | 11/2002 | Dodo |
| 6,491,098 B1 | 12/2002 | Dallas |
| 6,529,135 B1 | 3/2003 | Bowers et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 7,104,233 B2 | 9/2006 | Ryczek et al. |
| 7,170,262 B2 | 1/2007 | Pettigrew |
| 7,173,399 B2 | 2/2007 | Sihler |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,845,413 B2 | 12/2010 | Shampine et al. |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,534,235 B2 | 9/2013 | Chandler |
| 8,573,303 B2 | 11/2013 | Kerfoot |
| 8,596,056 B2 | 12/2013 | Woodmansee |
| 8,616,274 B2 | 12/2013 | Belcher et al. |
| 8,692,408 B2 | 4/2014 | Zhang et al. |
| 8,727,068 B2 | 5/2014 | Bruin |
| 8,760,657 B2 | 6/2014 | Pope |
| 8,774,972 B2 | 7/2014 | Rusnak et al. |
| 8,789,601 B2 | 7/2014 | Broussard |
| 8,807,960 B2 | 8/2014 | Stephenson |
| 8,838,341 B2 | 9/2014 | Kumano |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,067,182 B2 | 6/2015 | Nichols |
| 9,103,193 B2 | 8/2015 | Coli |
| 9,121,257 B2 | 9/2015 | Coli et al. |
| 9,140,110 B2 | 9/2015 | Coli et al. |
| 9,160,168 B2 | 10/2015 | Chapel |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |

(56) References Cited

U.S. PATENT DOCUMENTS

| | | |
|---|---|---|
| 9,475,021 B2 | 10/2016 | Coli et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,738,461 B2 | 8/2017 | DeGaray |
| 9,745,840 B2 | 8/2017 | Oehring et al. |
| 9,840,901 B2 | 12/2017 | Oehring et al. |
| 9,863,228 B2 | 1/2018 | Shampine et al. |
| 2002/0169523 A1 | 11/2002 | Ross et al. |
| 2003/0138327 A1 | 7/2003 | Jones et al. |
| 2004/0102109 A1 | 5/2004 | Cratty et al. |
| 2005/0116541 A1 | 6/2005 | Seiver |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0278140 A1 | 12/2007 | Mallet et al. |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0264649 A1 | 10/2008 | Crawford |
| 2009/0065299 A1 | 3/2009 | Vito |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0272158 A1 | 11/2011 | Neal |
| 2012/0018016 A1 | 1/2012 | Gibson |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0232728 A1 | 9/2012 | Karimi et al. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2014/0000899 A1 | 1/2014 | Nevison |
| 2014/0010671 A1 | 1/2014 | Cryer et al. |
| 2014/0054965 A1 | 2/2014 | Jain |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0246211 A1 | 9/2014 | Guidry et al. |
| 2014/0251623 A1 | 9/2014 | Lestz et al. |
| 2015/0068724 A1 | 3/2015 | Coli et al. |
| 2015/0068754 A1 | 3/2015 | Coli et al. |
| 2015/0083426 A1 | 3/2015 | Lesko |
| 2015/0114652 A1 | 4/2015 | Lestz |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211524 A1 | 7/2015 | Broussard |
| 2015/0225113 A1 | 8/2015 | Lungu |
| 2015/0252661 A1 | 9/2015 | Glass |
| 2015/0300145 A1 | 10/2015 | Coli et al. |
| 2015/0314225 A1 | 11/2015 | Coli et al. |
| 2016/0032703 A1 | 2/2016 | Broussard et al. |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0208593 A1 | 7/2016 | Coli et al. |
| 2016/0208594 A1 | 7/2016 | Coli et al. |
| 2016/0221220 A1 | 8/2016 | Paige |
| 2016/0230525 A1 | 8/2016 | Lestz et al. |
| 2016/0258267 A1 | 9/2016 | Payne et al. |
| 2016/0273328 A1 | 9/2016 | Oehring |
| 2016/0290114 A1 | 10/2016 | Oehring |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0021318 A1 | 1/2017 | McIver et al. |
| 2017/0022788 A1 | 1/2017 | Oehring et al. |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0037717 A1 | 2/2017 | Oehring et al. |
| 2017/0037718 A1 | 2/2017 | Coli et al. |
| 2017/0104389 A1 | 4/2017 | Morris et al. |
| 2017/0218843 A1 | 8/2017 | Oehring et al. |
| 2017/0222409 A1 | 8/2017 | Oehring et al. |
| 2017/0226842 A1 | 8/2017 | Omont et al. |
| 2017/0259227 A1 | 9/2017 | Morris et al. |
| 2017/0313499 A1 | 11/2017 | Hughes et al. |
| 2017/0314380 A1 | 11/2017 | Dehring |
| 2017/0369258 A1 | 12/2017 | DeGaray |

OTHER PUBLICATIONS

Non-Final Office Action issued in corresponding U.S. Appl. No. 15/293,681 dated Feb. 16, 2017.

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

Non-Final Office Action issued in corresponding U.S. Appl. No. 15/291,842 dated Jan. 6, 2017.

Final Office Action issued in corresponding U.S. Appl. No. 14/622,532 dated Dec. 7, 2016.

Non-Final Office Action issued in corresponding U.S. Appl. No. 14/622,532 dated May 17, 2016.

Final Office Action issued in corresponding U.S. Appl. No. 14/622,532 dated Dec. 21, 2015.

Non-Final Office Action issued in corresponding U.S. Appl. No. 14/622,532 dated Aug. 5, 2015.

Non-Final Office Action issued in corresponding U.S. Appl. No. 15/145,491 dated Sep. 12, 2016.

Non-Final Office Action issued in corresponding U.S. Appl. No. 15/217,040 dated Nov. 29, 2016.

(56) References Cited

OTHER PUBLICATIONS

Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Canadian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.

REMOTE MONITORING FOR HYDRAULIC FRACTURING EQUIPMENT

CROSS REFERENCE TO RELATED APPLICATIONS

This application is a continuation of U.S. patent application Ser. No. 15/293,681, filed Oct. 14, 2016, and claims priority to and the benefit of, U.S. Provisional Application Ser. No. 62/242,566, filed Oct. 16, 2015 and is a continuation-in-part of, and claims priority to and the benefit of co-pending U.S. patent application Ser. No. 15/202,085, filed Jul. 5, 2016, which claimed priority to and the benefit of Ser. No. 13/679,689, filed Nov. 16, 2012, which issued as U.S. Pat. No. 9,410,410 on Aug. 9, 2016; the full disclosures of which are hereby incorporated by reference herein for all purposes.

BACKGROUND OF THE INVENTION

1. Field of Invention

The present disclosure relates to hydraulic fracturing operations in a subterranean formations. In particular, the present disclosure relates to a hydraulic fracturing system with imaging devices that are strategically positioned to remotely monitor portions of the system.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore. A primary fluid for the slurry other than water, such as nitrogen, carbon dioxide, foam (nitrogen and water), diesel, or other fluids is sometimes used as the primary component instead of water. Typically hydraulic fracturing fleets include a data van unit, blender unit, hydration unit, chemical additive unit, hydraulic fracturing pump unit, sand equipment, and other equipment.

The process of making the fracturing fluid slurry necessarily includes combining, such as in the blender, hydration unit, chemical additive unit, etc., the individual components of the slurry. Such operation can be dangerous to operating personnel. For example, moving proppant into the blender unit can generate silica dust which, if inhaled by personnel, can cause permanent damage to the lungs. Common proppant types include silica sand, resin coated sand, and ceramic beads. Ceramic can be very harmful to inhale, and typically consists of very fine particles that become airborne and are difficult to filter out. Resin coated sand is the most dangerous and harmful to inhale since the resin coating can chip off and become airborne dust particles. Silica itself is very harmful to inhale as well.

Other components, such as chemicals, can be damaging and present hazards as well. One dangerous source of chemical contact comes from residue on tankers, trailer decks, reused hoses and camlock fittings, or leaky valves. In addition, there is always a risk for a major hose or chemical pump failure, or a tank/tote puncture. Some chemicals (such as, for example the viscosifier guar gel, and some friction reducers) can be hazardous because of how slick and slippery they are. Thus, a small amount on the skin, clothing, ground, or equipment can cause personnel to slip and fall, or lose their grip while climbing ladders, leading to injuries.

In addition, chemicals such as acids and breakers (for breaking down viscosifiers) are extremely corrosive to skin, damaging to inhale, can cause blindness, and other immediate hazards. Chemicals such as breakers are also very flammable, which becomes a hazard if there is a chance of contact with, for example, diesel fuel or gasoline. On diesel powered fracturing sites, it is very common for personnel to have diesel or oil residue on their hands, boots, or clothes.

Furthermore, in fracturing operations, it is also common to use biocides to kill bacteria deep in a well, such as to prevent deadly hydrogen sulfide gas build up. Biocides can be very damaging to living tissue, especially if ingested or inhaled. Additional chemicals that are dangerous if ingested or inhaled include stabilizers, pH buffers, and inhibitors.

In addition to the above, hydraulic fracturing operations can be dangerous for operating personnel because of high pressure and high voltage equipment. For example, high pressure zones are present where the discharge piping leaves the hydraulic fracturing pumps at pressures of up to 15,000 pounds per square inch (psi) or more. If the pipes fail, they can explode, causing shrapnel to fly. Furthermore, iron pipes can shift and pivot with the pressure release striking employees.

Some voltages in the electric hydraulic fracturing systems can reach up to 13,800 volts or more. Dangers in high voltage zones include arc flashes, fires, electrocution, and explosions. Hazards can result from breaker or cable coupler failures, or even natural gas vapors entering the area. It is desirable, therefore, to design a hydraulic fracturing system to minimize such dangerous exposure of operating personnel.

SUMMARY OF THE INVENTION

The present technology provides a hydraulic fracturing system for fracturing a subterranean formation, including a pump in communication via pump components with a wellbore that intersects the formation, and that pressurizes fluid in the wellbore, the fluid including a fracturing fluid slurry. The system further includes hydraulic fracturing system components for making the fracturing fluid slurry, and a monitoring system that selectively captures and transmits real time images of at least one of the hydraulic fracturing system components or pump components to enable remote monitoring of the at least one of the hydraulic fracturing system components or pump components.

In some embodiments, the monitoring system can include a camera, a controller, a display, a human machine interface, and communication means between the camera, controller, human machine interface, and the monitor. In addition, the display can include a monitor from which the images are viewed. In some example embodiments, the display can be disposed within a passenger compartment mounted to a fluid blender, so that the images can be viewed by operations personnel in the passenger compartment.

According to some embodiments, the hydraulic fracturing components can be selected from the group consisting of a chemical tanker, a hydration unit, a hopper, a blender unit, and auger associated with a blender unit, a conveyor, and an acid tanker. In addition, the pump components can be selected from the group consisting of intake piping, discharge piping, hoses, fittings, and valves associated with a hydraulic fracturing pump. Furthermore, the monitoring system can include a camera disposed on a trailer, and wherein the hydraulic fracturing components or pump components include hose or pipe connections on the trailer. In alternate embodiments, the monitoring system can include a camera disposed on a first trailer, and wherein the hydraulic fracturing components or pump components include hose or pipe connections on a second trailer that is adjacent the first trailer.

In some example embodiments, the monitoring system can selectively capture and transmit real time images of a silica exposure zone, or of an opening to a vessel, so that a level within the vessel is discernible in the images. In some embodiments, the vessel can contain proppant, acid, or chemicals.

Another embodiment of the present technology provides including the steps of driving a pump to pressurize fluid in a hydraulic fracturing system containing hydraulic fracturing components and pump components, fracturing the formation by directing the pressurized fluid into a wellbore that intersects the formation, and monitoring the hydraulic fracturing system. The step of monitoring the hydraulic fracturing system includes obtaining images of hydraulic fracturing components and pump components of the hydraulic fracturing system, and viewing the images remotely.

In some embodiments, the hydraulic fracturing components and pump components can be disposed in areas where there is a greater possibility of personal injury than where the images are being viewed. In some embodiments, step of obtaining images can be performed by a camera that is disposed adjacent at least one of the hydraulic fracturing components or the pump components, and the step of viewing can be performed within an enclosure.

In certain other embodiments, the method can include selectively obtaining images of different hydraulic fracturing components or pump components on a single monitor. Furthermore, the hydraulic fracturing components and pump components can include discharge piping that is in fluid communication with the pump, and vessel openings, and the images of the hydraulic fracturing system can include images of at least one of a silica exposure zone, hose connections, a high pressure zone that includes discharge pumps or discharge pipes or both, a chemical exposure zone, high voltage zones, and natural gas supply piping.

BRIEF DESCRIPTION OF DRAWINGS

Some of the features and benefits of the present invention having been stated, others will become apparent as the description proceeds when taken in conjunction with the accompanying drawings, in which.

Figure 1:
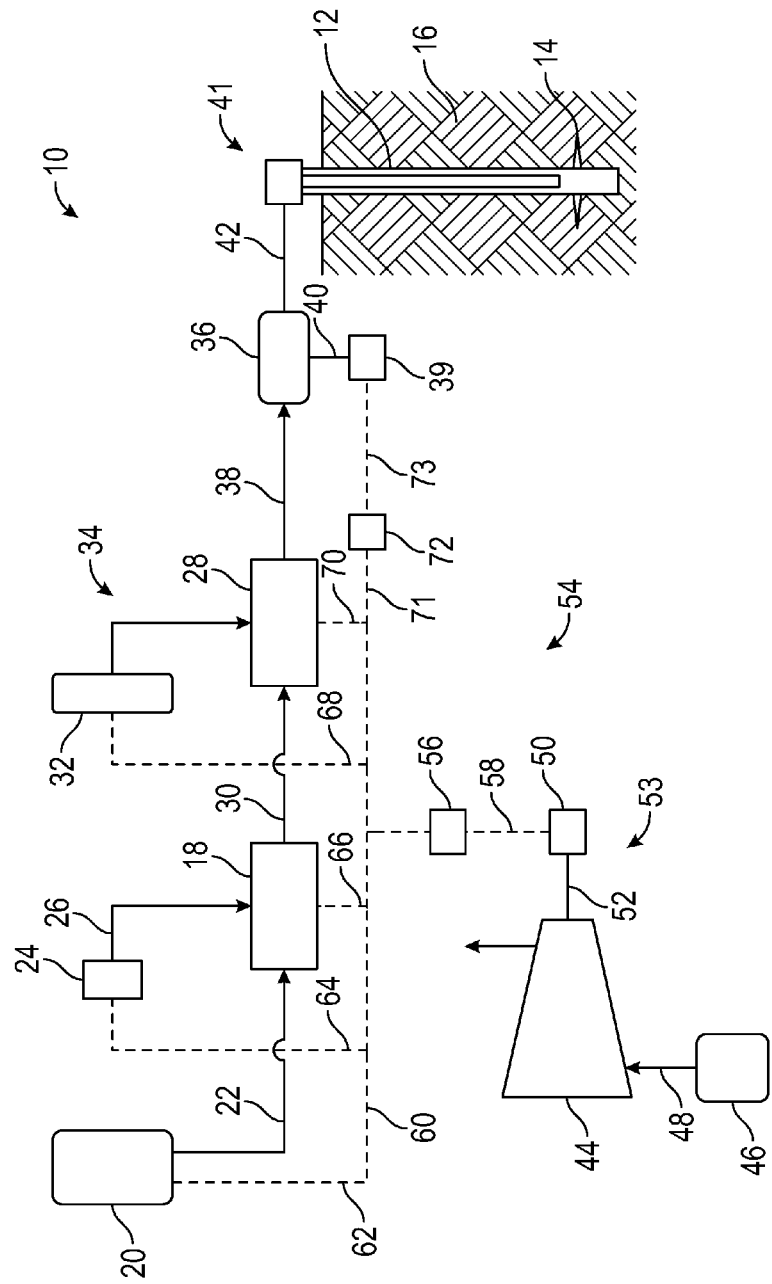
FIG. 1 is a schematic example of a hydraulic fracturing system for use in fracturing a subterranean formation.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a schematic example of a hydraulic fracturing system 10 that is used for pressurizing a wellbore 12 to create fractures 14 in a subterranean formation 16 that surrounds the wellbore 12. Included with the system 10 is a hydration unit 18 that receives fluid from a fluid source 20 via line 22, and also selectively receives additives from an additive source 24 via line 26. Additive source 24 can be separate from the hydration unit 18 as a stand-alone unit, or can be included as part of the same unit as the hydration unit 18. The fluid, which in one example is water, is mixed inside of the hydration unit 18 with the additives. In an embodiment, the fluid and additives are mixed over a period of time, to allow for uniform distribution of the additives within the fluid. In the example of FIG. 1, the fluid and additive mixture is transferred to a blender unit 28 via line 30. A proppant source 32 contains proppant, which is delivered to the blender unit 28 as represented by line 34, where line 34 can be a conveyer. Inside the blender unit 28, the proppant and fluid/additive mixture are combined to form a fracturing slurry, which is then transferred to a fracturing pump system 36 via line 38; thus fluid in line 38 includes the discharge of blender unit 28 which is the suction (or boost) for the fracturing pump system 36.

Blender unit 28 can have an onboard chemical additive system, such as with chemical pumps and augers. Optionally, additive source 24 can provide chemicals to blender unit 28; or a separate and standalone chemical additive system (not shown) can be provided for delivering chemicals to the blender unit 28. In an example, the pressure of the slurry in line 38 ranges from around 80 psi to around 100 psi. The pressure of the slurry can be increased up to around 15,000 psi by pump system 36. A motor 39, which connects to pump system 36 via connection 40, drives pump system 36 so that it can pressurize the slurry. In one example, the motor 39 is controlled by a variable frequency drive ("VFD").

After being discharged from pump system 36, slurry is pumped into a wellhead assembly 41. Discharge piping 42 connects discharge of pump system 36 with wellhead assembly 41 and provides a conduit for the slurry between the pump system 36 and the wellhead assembly 41. In an alternative, hoses or other connections can be used to provide a conduit for the slurry between the pump system 36 and the wellhead assembly 41. Optionally, any type of fluid can be pressurized by the fracturing pump system 36 to form injection fracturing fluid that is then pumped into the wellbore 12 for fracturing the formation 14, and is not limited to fluids having chemicals or proppant.

An example of a turbine 44 is provided in the example of FIG. 1. The turbine can be gas powered, receiving a combustible fuel from a fuel source 46 via a feed line 48. In one example, the combustible fuel is natural gas, and the fuel source 46 can be a container of natural gas or a well (not shown) proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50.

An example of a micro-grid 54 is further illustrated in FIG. 1, and which distributes electricity generated by the turbine generator 53. Included with the micro-grid 54 is a transformer 56 for stepping down voltage of the electricity generated by the generator 50 to a voltage more compatible for use by electrically powered devices in the hydraulic fracturing system 10. In another example, the power generated by the turbine generator and the power utilized by the electrically powered devices in the hydraulic fracturing system 10 are of the same voltage, such as 4160 V, so that main power transformers are not needed. In one embodiment, multiple 3500 kVA dry cast coil transformers are utilized. Electricity generated in generator 50 is conveyed to transformer 56 via line 58. In one example, transformer 56 steps the voltage down from 13.8 kV to around 600 V. Other step down voltages can include 4,160 V, 480 V, or other voltages.

The output or low voltage side of the transformer 56 connects to a power bus 60, lines 62, 64, 66, 68, 70, and 71 connect to power bus 60 and deliver electricity to electrically powered components of the system 10. More specifically, line 62 connects fluid source 20 to bus 60, line 64 connects additive source 24 to bus 60, line 66 connects hydration unit 18 to bus 60, line 68 connects proppant source 32 to bus 60, line 70 connects blender unit 28 to bus 60, and line 71 connects bus 60 to an optional variable frequency drive ("VFD") 72. Line 73 connects VFD 72 to motor 39. In one example, VFD 72 can be used to control operation of motor 39, and thus also operation of pump 36.

In an example, additive source 24 contains ten or more chemical pumps for supplementing the existing chemical pumps on the hydration unit 18 and blender unit 28. Chemicals from the additive source 24 can be delivered via lines 26 to either the hydration unit 18 and/or the blender unit 28. In one embodiment, the elements of the system 10 are mobile and can be readily transported to a wellsite adjacent the wellbore 12, such as on trailers or other platforms equipped with wheels or tracks.

Figure 2:
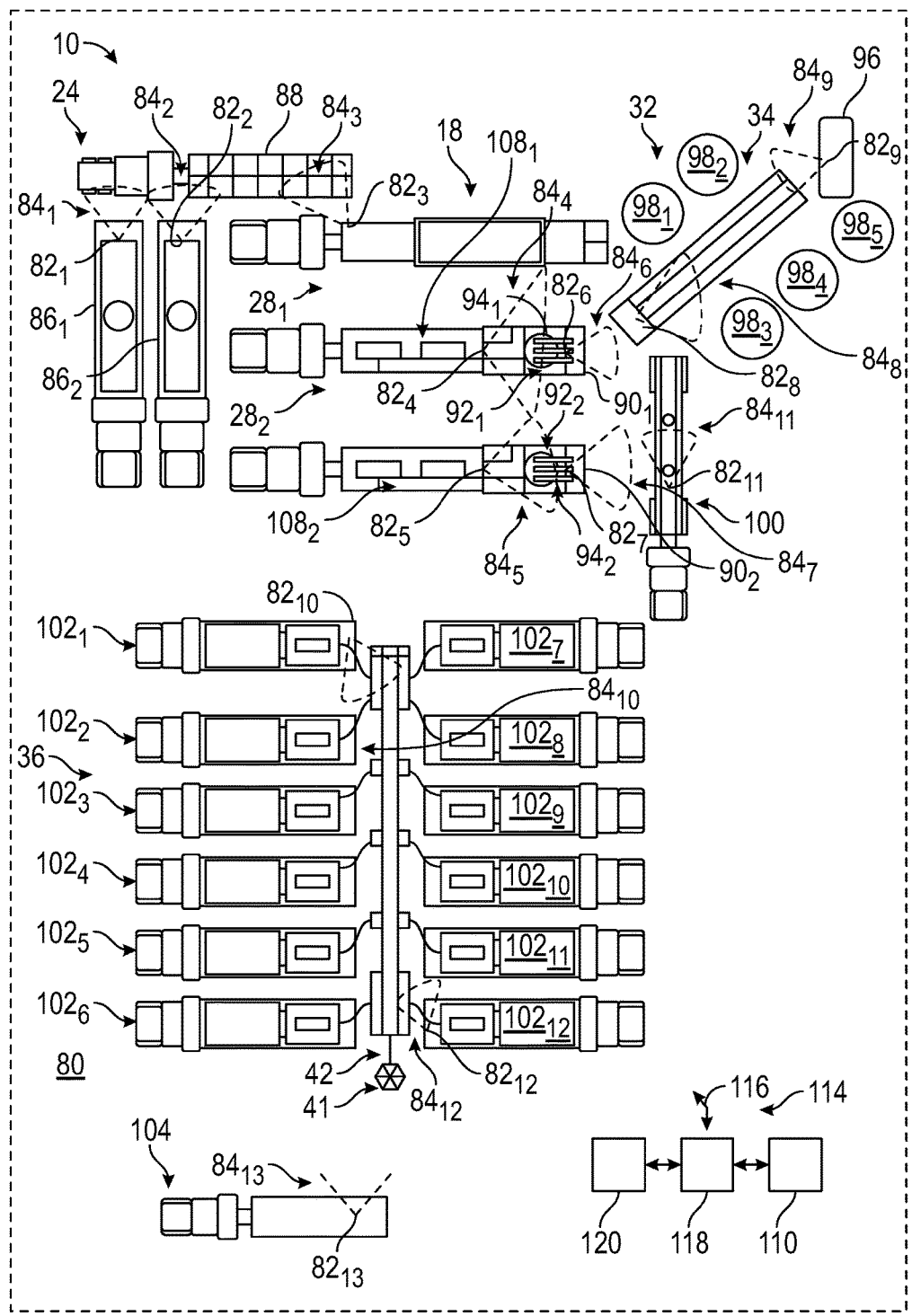
FIG. 2 is a plan schematic view of an alternate example of the system of FIG. 1, and which includes examples of visual monitoring equipment.

Referring now to FIG. 2 shown in a plan schematic view is an example of the hydraulic fracturing system 10 as arranged at a well site 80. In this example, a series of cameras $82_{1-13}$ are shown strategically located about the system 10 in order to capture real time images of designated portions of the hydraulic fracturing system 10. Image zones $84_{1-13}$ are shown that are associated with each of the cameras $82_{1-13}$ and depict an example of objects in an area or space whose image is captured by the cameras $82_{1-13}$. Cameras $82_{1,2}$ of FIG. 2 are depicted mounted respectively on chemical tankers $86_{1,2}$ and are oriented so that their respective image zones $84_{1,2}$ encompass rear portions of the chemical tankers $86_{1,2}$. Thus the image(s) captured by cameras $82_{1,2}$ includes images of the rear portions of the chemical tankers $86_{1,2}$. Specific hardware imaged in one example of the image zones $84_{1,2}$ include hose connections and booster pumps (not shown) on the rear of these tankers $86_{1,2}$. Optionally, the image zones $84_{1,2}$ may extend to an adjacent chemical trailer 88 shown adversely located adjacent tankers $86_{1,2}$. Mounted on hydration unit 18 is camera $82_3$ whose image zone $84_3$ covers a rear portion of chemical tanker 88; images captured by camera $82_3$ may be analyzed for leaks or failed hose connections. Trailer mounted blender units $28_{1,2}$ are shown disposed on a side of hydration unit 18 and opposite from chemical trailer 88. Ends of the trailers includes hoppers $90_{1,2}$ that selectively contain sand or proppant that is drawn from the hoppers $90_{1,2}$ with auger sets $92_{1,2}$. Cameras $82_{6,7}$ are mounted on augers $92_{1,2}$, and wherein the associated image zones $84_{6,7}$ of the cameras $86_{6,7}$ includes the hoppers $90_{1,2}$. Thus, analyzing information collected by cameras $82_{6,7}$ can provide information indicating a level of sand or proppant within hoppers $90_{1,2}$, without an operator approaching the hoppers $90_{1,2}$.

As described above, the sand or proppant drawn from hoppers $90_{1,2}$ by augers $94_{1,2}$ is deposited within tubs $94_{1,2}$ where it can be mixed with fluids in order to form a slurry. Cameras $82_{4,5}$ are mounted on blender units $28_{1,2}$ respectively, and have image zones $84_{4,5}$ that capture the opening of the hoppers $90_{1,2}$. Thus analyzing data or images captured by cameras $82_{4,5}$ provides information real time about the level of the slurry mixture within hoppers $90_{1,2}$, again without an operator approaching the hoppers $90_{1,2}$.

Camera $82_9$ is shown mounted on a dust collector 96 which is disposed adjacent an end of conveyor 34 that is distal from blender units $28_{1,2}$. The image zone $84_9$ encompasses an end of conveyor 34 distal from blender units $28_{1,2}$. Silos $98_{1-5}$ or other proppant dispensers are shown disposed on alternating sides of conveyor 34 and which can be used to dispense sand or proppant onto conveyor 34, which then deposits the sand or proppant into the hoppers $90_{1,2}$. Camera $82_8$ has a corresponding image zone $84_8$ that captures information along conveyor 34 proximate to hoppers $90_{1,2}$ and distal from dust collector 96. Shown having an end proximate where conveyor 34 interfaces with hoppers $90_{1,2}$ is an acid tanker 100 which can optionally be used to deposit acidic material into the fluid being deposited into the wellbore 12 (FIG. 1). Camera $82_{11}$ is mounted on acid tanker 100 and shown having an image zone $84_{11}$ that encompasses openings on the acid tanker 100 so that levels of material within acid tanker 100 can be monitored by viewing images captured by camera $82_{11}$. Camera $82_{11}$ can be useful to make sure the acid tanker 100 does not overflow, which condition could be caused by a valve failure and resultant fluid backflush. Typically, an operator monitors the acid tanker, and regularly gives hand signals to indicate the operating conditions of the acid tanker 100. Hand signals are preferable to radios when communicating such information, since the operator near the acid tanker typically dresses in protective clothing that can make it difficult to use a radio.

Camera $82_{11}$ can be used either to view the acid tanker itself, or also to view the operator displaying hand signals.

Arranged in rows and transverse to acid tanker 100 are pump trucks $102_{1-12}$, which make up the pump system 36 for pressurizing the slurry so that it can be injected into wellhead 41. Discharge piping 42 is shown extending along a path adjacent each of the pump trucks $102_{1-12}$ and having an end connected to wellhead assembly 41. Cameras $82_{10,12}$ are shown with image zones $84_{10,12}$ that cover hoses, fittings, and an area where discharge leads from the specific pumps on the pump trucks $102_{1,12}$ interface with discharge piping 42. While a pair of cameras $82_{10,12}$ are illustrated, cameras may be provided for each pair of the pump trucks $102_{1,12}$ or each one individually. Shown spaced away from the rows of pump trucks $102_{1-12}$ is a data van 104 and on which camera $82_{13}$ is mounted. The corresponding image zone $84_{13}$ of camera $82_{13}$ is directed towards wellhead assembly 41 and can observe the wellhead assembly 41 as well as all discharge piping 42 and at least some of the leads connecting to piping 42. Thus situated, camera $82_{13}$ allows personnel to stay out of the high pressure zones around the pumps. This is useful because is a pipe fails at high pressure, it can seriously injure personnel with, for example, flying shrapnel.

Figure 3:
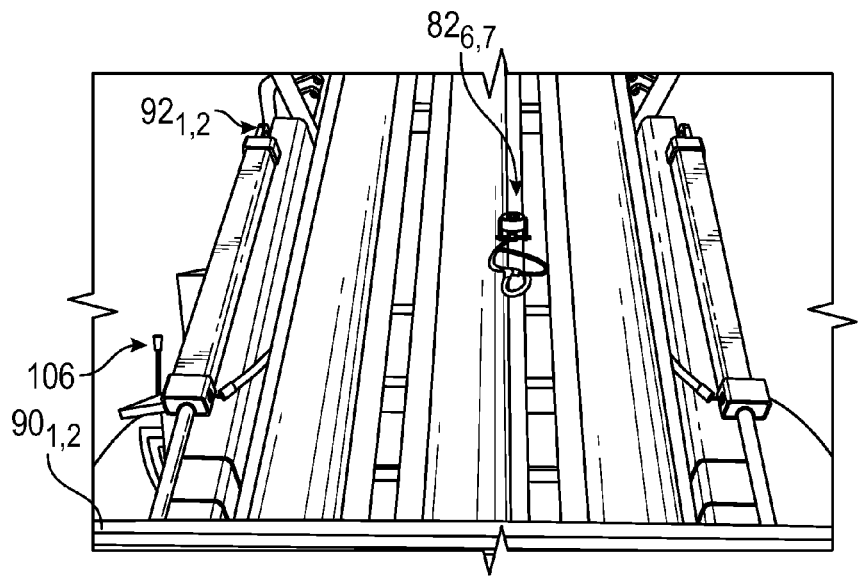
FIG. 3 is a perspective view of an example of a visual monitoring device mounted on a blender, where the blender is included with the hydraulic fracturing system of FIG. 1.

Shown in an end perspective view in FIG. 3 is an example of camera $82_{6,7}$ mounted on one of the auger elements that make up auger system $92_{1,2}$. Here each of the auger elements includes a tube and a screw-like member that rotates within the tube in order to urge the proppant upward from the hopper $90_{1,2}$ and into hopper $94_{1,2}$ (FIG. 2). Further illustrated in FIG. 3 is an example of a hydraulic system 106 for raising and lowering the auger system, $92_{1,2}$. As shown, camera $82_{6,7}$ is mounted to one of the auger tubes via a bolted connection.

Figure 4:
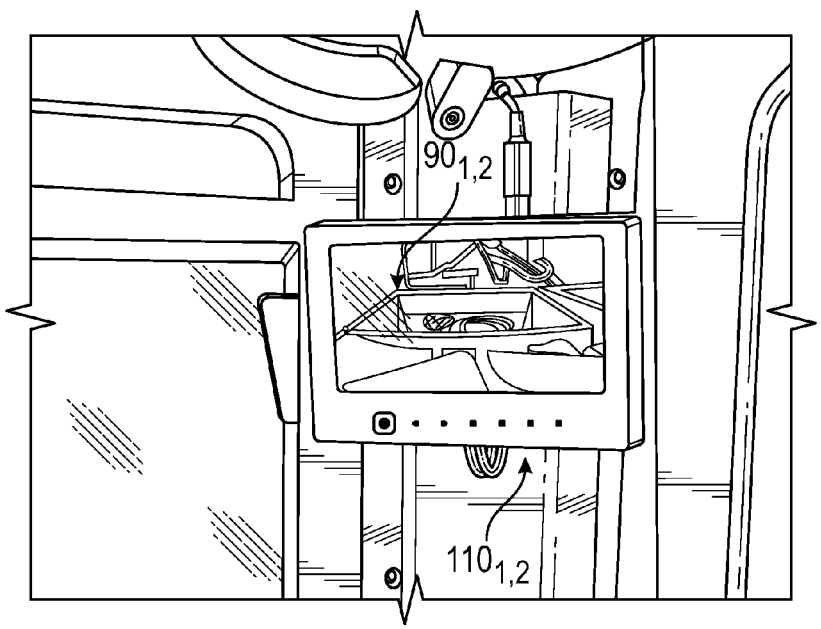
FIGS. 4 and 5 are perspective views of an example of a monitor displaying images captured by a visual monitoring device.

FIG. 4 illustrates an example of viewing an image of hopper $90_{1,2}$ within a blender cab $108_{1,2}$ that is part of the blender unit $28_{1,2}$ (FIG. 2). A monitor $110_{1,2}$ is mounted within cab $108_{1,2}$ that is in communication with camera $82_{6,7}$. Accordingly, a designated portion within system 10 (FIG. 2) can be remotely viewed by operations personnel in an enclosed space and away from an area that may present hazards to personnel. Alternately, this camera feed can also be viewed within the datavan.

Figure 5:
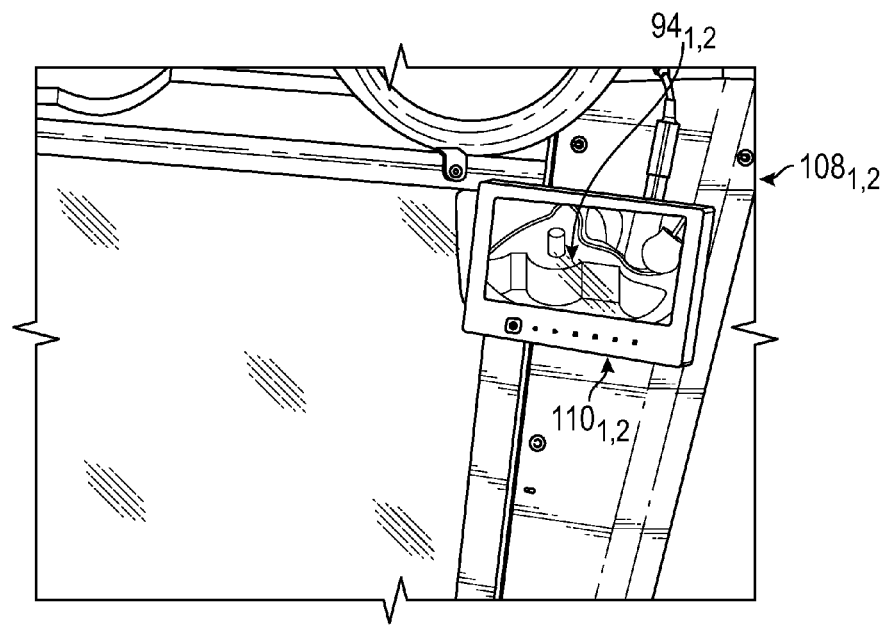

FIG. 5 illustrates one example where operations personnel can selectively change the image being viewed to that of a separate camera. For example, within cab $108_{1,2}$, monitor $110_{1,2}$ is displaying an example of mixing tub $94_{1,2}$. In an example, changing the display on the monitor $110_{1,2}$ to view other images is accomplished by an operator manipulating a human machine interface ("HMI") which can be a keyboard, joystick, panel, or any other device that allows a user to adjust operation or control of what is being viewed on monitor $110_{1,2}$. Again, the image of the tub $94_{1,2}$ is being remotely viewed in an enclosed space that is away from a potentially hazardous area.

Figure 6:
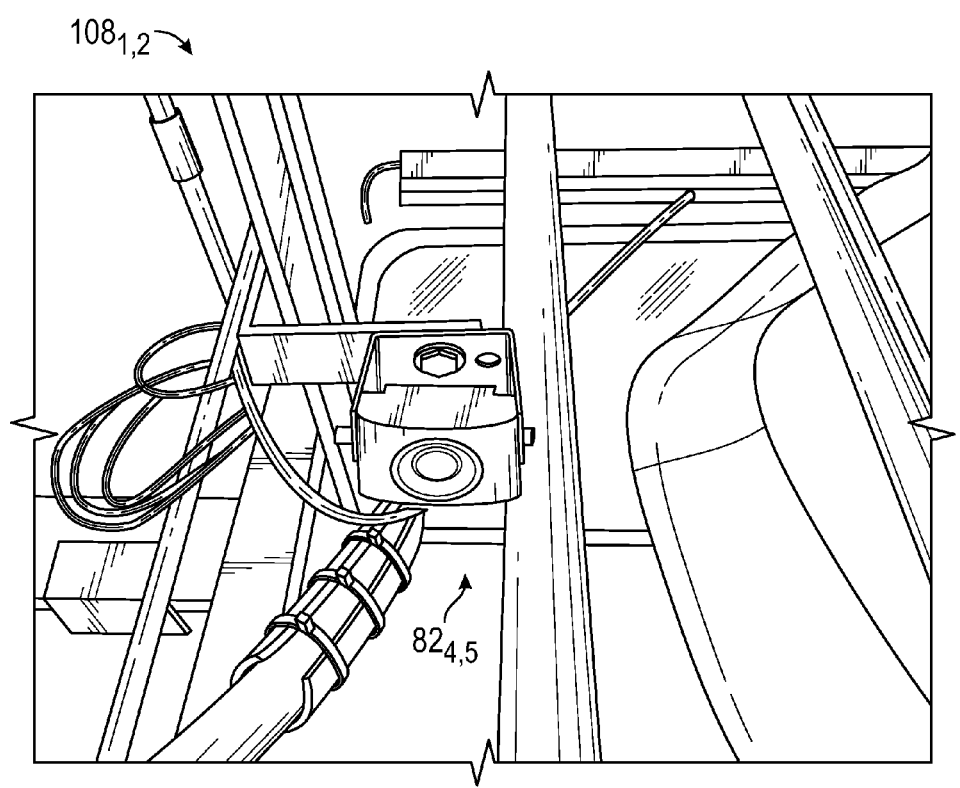
FIGS. 6 and 7 are lower and upper views of an example of a visual monitoring device that is mounted on the blender of FIG. 3.

FIG. 6 illustrates an example of camera $82_{4,5}$ mounted on blender unit $28_{1,2}$ (FIG. 2) and outside of cab $108_{1,2}$. Here, the end of the camera $82_{4,5}$ having a lens is pointing away from cab $108_{1,2}$ and mounting hardware in brackets are shown suspending camera $82_{4,5}$ at a strategically located orientation so that designated portions can be monitored with camera $82_{4,5}$.

Figure 7:
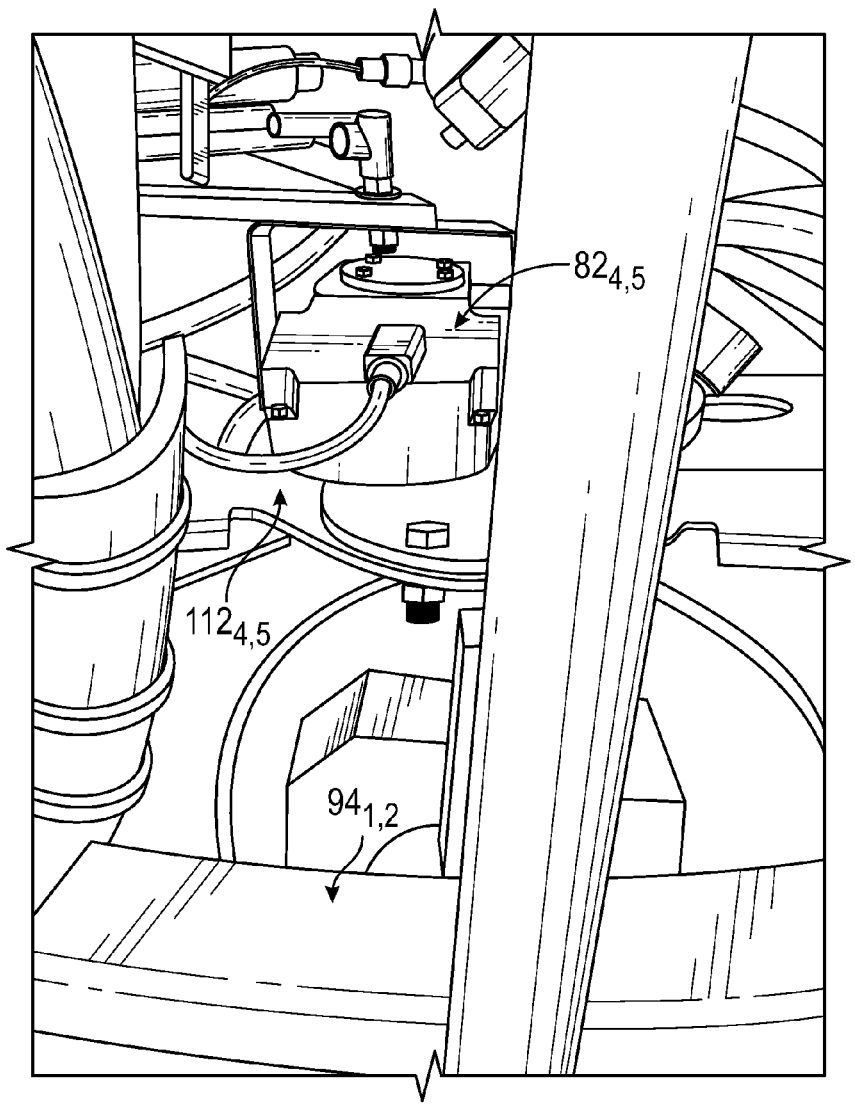

FIG. 7 shows in a perspective view an example of camera $82_{4,5}$ taken from a rear view and having lead $112_{4,5}$ leading from camera $82_{4,5}$ so that images captured by camera $82_{4,5}$ can be processed and transmitted to a location that is remote to camera $82_{4,5}$ for viewing.

Referring back to FIG. 2, a schematic example of monitoring system 114 is shown which includes cameras $82_{1-13}$, monitor 110, a communication means 116, controller 118, and human machine interface 120. Communication means 116 can be any form of communicating data that represents images within system 114, and can be wireless, hard-wired, or fiber optic material. Controller 118 can be an information handling system, and may include a processor, memory accessible by the processor, non-volatile storage area accessible by the processor, and logics for performing each of the steps required for operation of the controller 118.

Advantages of the monitoring system 114 described herein are that all parts of silica exposure zones, including the silos $98_{1-5}$, or any other sand storage container, sand conveyor, and dust vacuum system, can be monitored without the requirement for operations personnel to enter this region, thereby shielding personnel from harmful silica dust. Moreover, high-pressure zones where high-pressure fluid is being pumped within piping can be imaged without requiring operations personnel to be proximate the piping when high pressure fluid is within the piping. Chemical areas can also be monitored remotely and so that operations personnel are not subject to exposure to hazardous chemicals. Moreover, areas of the system 10 that contain cables at a high voltage may also be remotely monitored thereby avoiding the need for personnel to enter these zones. In addition, cameras can be used to monitor fuel gas lines for the turbines that power the electric motors on an electric fleet. In one optional embodiment, mounts for the cameras $82_{1-13}$ are able to pivot on two axes and can be adjusted up down and left and right. The imaging can be displayed on video and discernible by operations personnel such that visual images reproduced real time. In one alternative, infrared imaging is performed.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:

a pump in communication via pump components with a wellbore that intersects the formation, and that pressurizes fluid in the wellbore, the fluid comprising a fracturing fluid slurry;

hydraulic fracturing system components for making the fracturing fluid slurry; and a monitoring system that selectively captures and transmits real time images of a blender unit to enable remote monitoring of the blender unit;

wherein the monitoring system selectively captures and transmits real time images of a hopper of the blending unit, so that a slurry level within the hopper is discernible in the images.

2. The hydraulic fracturing system of claim 1, wherein the monitoring system comprises:
   a camera;
   a controller;
   a display;
   a human machine interface; and
   communication means between the camera, controller, human machine interface, and the display.

3. The hydraulic fracturing system of claim 1, wherein the display comprises a monitor from which the images are viewed.

4. The hydraulic fracturing system of claim 3, wherein the display is disposed within a passenger compartment mounted to the blender unit, so that the images can be viewed by operations personnel in the passenger compartment.

5. The hydraulic fracturing system of claim 1, wherein the monitoring system selectively captures and transmits real time images of a silica exposure zone.

6. The hydraulic fracturing system of claim 1, wherein the monitoring system comprises a camera disposed on an auger of the blender unit, the auger transmitting proppant to the hopper.

7. The hydraulic fracturing system of claim 6, wherein an image zone of the camera includes at least the auger and the hopper.

8. A hydraulic fracturing system for fracturing a subterranean formation comprising:
   a pump in communication via pump components with a wellbore that intersects the formation, and that pressurizes fluid in the wellbore, the fluid comprising a fracturing fluid slurry;
   hydraulic fracturing system components for making the fracturing fluid slurry; and
   a monitoring system that selectively captures and transmits real time images of discharge piping of the pump to enable remote monitoring of the pump;
   wherein the monitoring system selectively captures and transmits real time images of at least one of the discharge piping or leads connected to the discharge piping, so that potential leak points are discernible in the images.

9. The hydraulic fracturing system of claim 8, wherein the monitoring system comprises:
   a camera;
   a controller;
   a display;
   a human machine interface; and
   communication means between the camera, controller, human machine interface, and the display.

10. The hydraulic fracturing system of claim 9, wherein the display comprises a monitor from which the images are viewed.

11. The hydraulic fracturing system of claim 8, wherein the pump components are selected from the group consisting of intake piping, discharge piping, hoses, fittings, and valves associated with the pump.

12. The hydraulic fracturing system of claim 8, wherein the monitoring system selectively captures and transmits real time images of a high pressure zone around the pumps.

13. The hydraulic fracturing system of claim 8, wherein the monitoring system comprises a camera disposed on at least one of a pump truck or a data van.

14. The hydraulic fracturing system of claim 13, wherein an image zone of the camera includes at least the discharge piping, the leads, and a wellhead assembly.

15. The method of claim 14, wherein the blending unit further comprises an auger, and wherein the images of at least one of the auger or the hopper include a silica exposure zone.

16. A method of fracturing a subterranean formation comprising:
   driving a pump to pressurize fluid in a hydraulic fracturing system containing hydraulic fracturing components and pump components;
   fracturing the formation by directing the pressurized fluid into a wellbore that intersects the formation; and
   monitoring the hydraulic fracturing system with a monitoring system by:
      obtaining images of a blender unit of the hydraulic fracturing system; and
      viewing the images remotely;
      wherein the monitoring system selectively captures and transmits real time images a hopper of the blending unit, so that a slurry level within the hopper is discernible in the images.

17. The method of claim 16, wherein the blender unit is disposed in areas where there is a greater possibility of personal injury than where the images are being viewed.

18. The method of claim 16, wherein the step of obtaining images is performed by a camera that is disposed adjacent or on the blender unit.

19. The method of claim 16, wherein the step of viewing is performed within an enclosure.

20. The method of claim 16, further comprising:
   selectively obtaining images of different blending units on a single monitor.

* * * * *